Feb. 19, 1935.　　　L. D. SOUBIER　　　1,991,708
GLASSWARE FORMING MACHINE
Original Filed July 25, 1932　　5 Sheets-Sheet 2

Inventor
Leonard D. Soubier
By J. F. Rule,
Attorney

Feb. 19, 1935.  L. D. SOUBIER  1,991,708
GLASSWARE FORMING MACHINE
Original Filed July 25, 1932   5 Sheets-Sheet 3

Inventor
Leonard D. Soubier
By J. F. Rule,
Attorney

Feb. 19, 1935.    L. D. SOUBIER    1,991,708
GLASSWARE FORMING MACHINE
Original Filed July 25, 1932    5 Sheets-Sheet 4
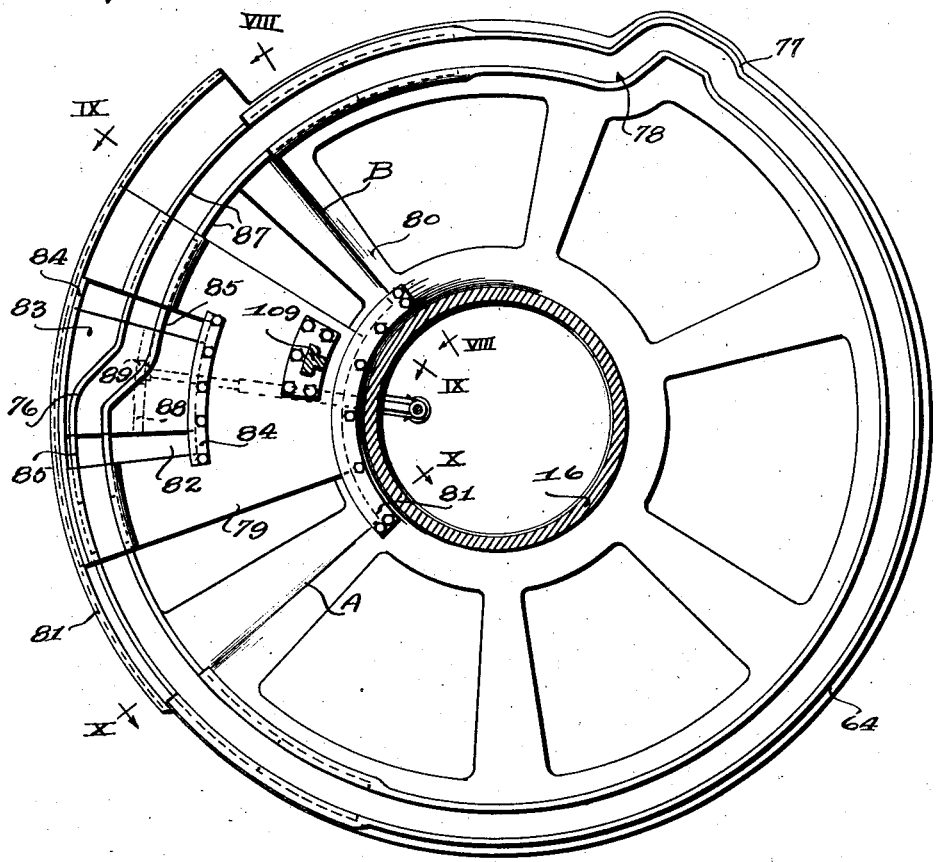
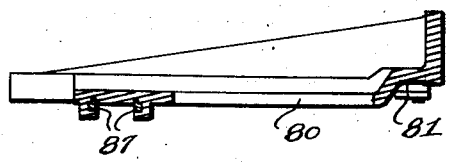
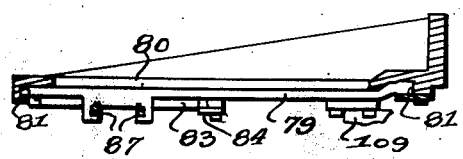
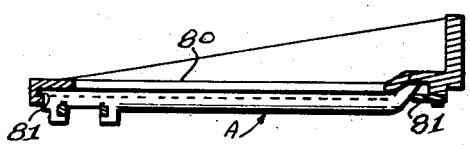
Inventor
Leonard D. Soubier
By J. F. Rule
Attorney Feb. 19, 1935.  L. D. SOUBIER  1,991,708
GLASSWARE FORMING MACHINE
Original Filed July 25, 1932  5 Sheets-Sheet 5

Inventor
Leonard D. Soubier
By J. F. Rule.
Attorney

Patented Feb. 19, 1935

1,991,708

UNITED STATES PATENT OFFICE 1,991,708

GLASSWARE FORMING MACHINE

Leonard D. Soubier, Toledo, Ohio, assignor to Owens-Illinois Glass Company, a corporation of Ohio Application July 25, 1932, Serial No. 624,397
Renewed August 16, 1934

9 Claims. (Cl. 49—9)

The present invention relates to improvements in glassware forming machines and more particularly to that type consisting of an annular series of mold groups or units' which are rotated continuously about a vertical axis and thereby caused to move in succession past a series of operating positions at one of which an elevated glass feeder having a bottom outlet opening, operates at regular time intervals to deliver mold charges or gobs of molten glass to the blank molds of said mold groups.

In machines of the above character each mold group consists of cooperating partible body blank and neck molds, the former having a charging opening normally facing upwardly to admit mold charges of glass. Also, there is a finishing mold in which the blanks or parisons formed in the body blank and neck molds are placed for final expansion. The body blank and neck molds are adapted to be inverted and reinverted at regular time intervals so that the charging opening faces upwardly during the mold charging operation and at other times the molds are suspended from the lower side of their support with the body blank mold open so that a bare blank or parison occupies a normal upright position in which it may be enclosed by the finishing mold for final shaping.

In the production of hollow glass articles on a machine of the above character, it is customary after the blanks have been formed to invert the blank and neck molds at a predetermined point and shortly thereafter, open the body blank mold so that the blank or parison is suspended from the neck mold while the finishing mold is raised and closed about said parison. The blank is then expanded in the finishing mold. The time and point of occurrence of these two operations are fixed relative to each other and the other operations. Because of the fixed relation between these operations the extent to which the blanks or parisons are chilled by contact with the molds as well as the point of inversion of the molds preparatory to transferring the blanks or parisons to the finishing molds, will be constant irrespective of the variations in the size of the blanks or parisons which may in reality call for radical changes in this connection. Thus, if the operations are timed to satisfactorily produce articles of a given size, a mold change to produce somewhat smaller articles without also adjusting the mold opening and inverting points will result in excessively deep chilling of the blanks or parisons and consequent unsatisfactory final expansion of the blanks in the finishing molds. In fact, complete expansion may not be obtainable in many instances. On the other hand, if the molds are changed to produce larger articles, the period of contact between the glass and the blank mold will, in all probability, be insufficient to chill the glass to an extent insuring against undue elongation and/or distortion of the blank or parison during the time the body blank mold is opening and the finishing mold rising and closing about said blank.

An object of the present invention is the provision of novel means whereby both the opening of the body blank mold and inversion of the entire blank forming unit may be adjusted relative to each other and the remaining operations. To this end, there is provided means operable without interrupting normal operation of the machine for advancing or retarding the blank mold inverting and opening operations together with respect to other usual operations and/or the mold opening operation alone.

Other objects will be in part apparent and in part pointed out hereinafter.

In the accompanying drawings:

Fig. 7 is a bottom plan view of the blank mold cam.

Figs. 8, 9, and 10, are sectional views taken along the lines VIII—VIII, IX—IX, and X—X, respectively, of Fig. 7.

Figure 11:
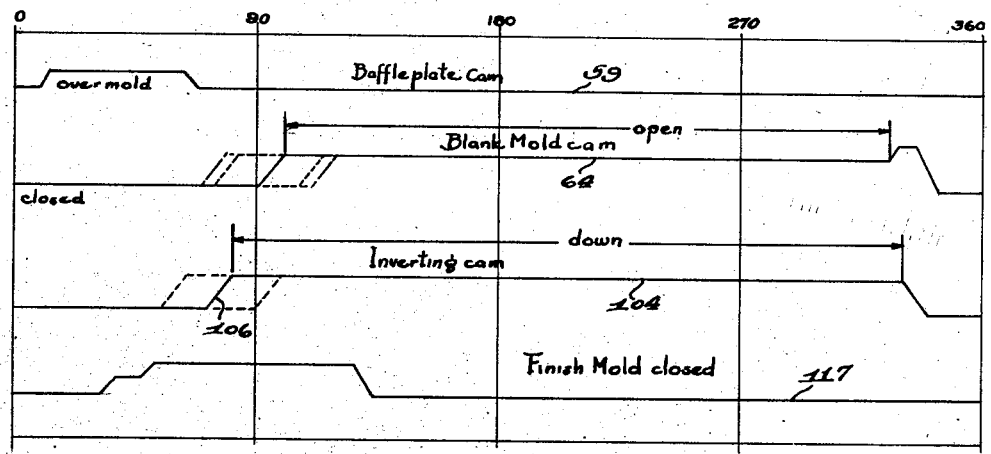

Fig. 11 is a cam chart.

Figure 12:
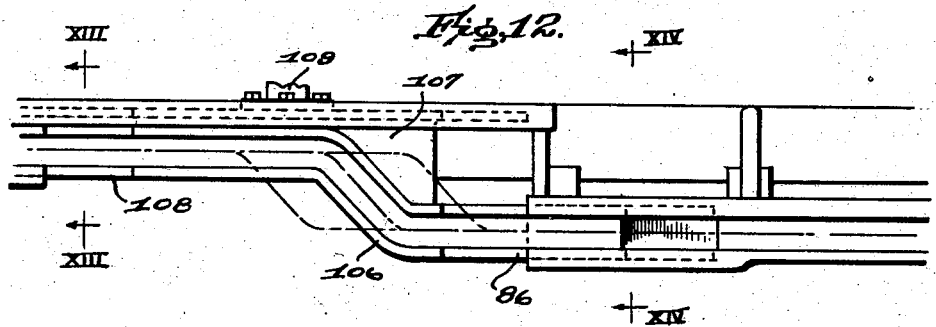

Fig. 12 is a fragmentary detail elevational view of the adjustable section of the blank mold inverting cam.

Figure 13:
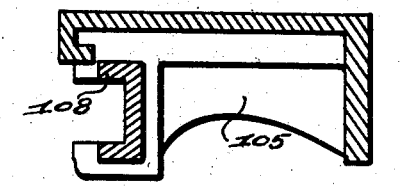

Fig. 13 is a sectional view taken along the line XIII—XIII of Fig. 12.

Figure 14:
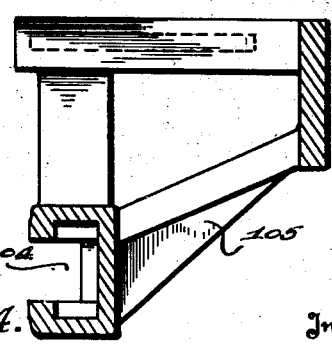

Fig. 14 is a sectional view taken along the line XIV—XIV of Fig. 12.

Figure 2:
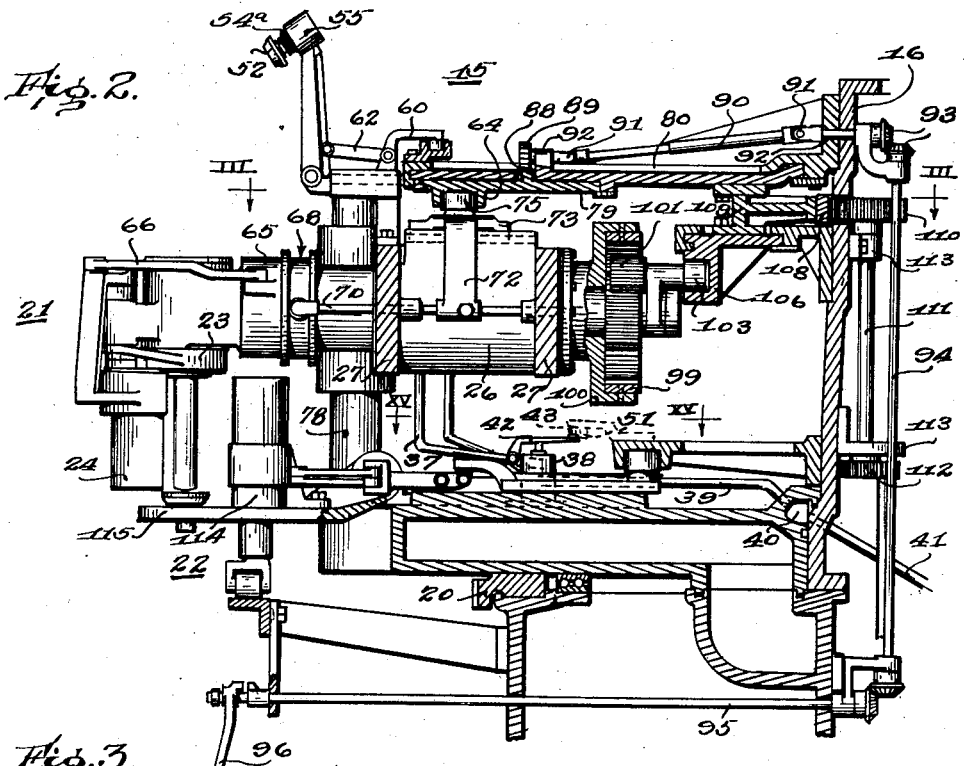
Fig. 2 is a view similar to Fig. 1 showing the blank mold unit inverted and a bare blank suspended from the neck mold.
Figure 15:
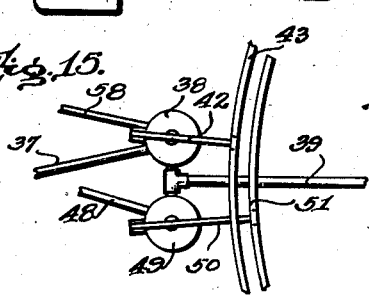

Fig. 15 is a sectional plan view taken substantially along the plane of line XV—XV of Fig. 2.

In more or less general terms the illustrated embodiment of the present invention consists of an annular series of mold groups 15 or units mounted for continuous rotation about the axis of a vertical central column 16, such rotation bringing the mold groups in succession to a series of operating positions in one of which mold charges of molten glass are delivered to the blank molds of a forming machine. At other positions the mold charges are subjected to the usual expanding operations for the purpose of transforming them into finished articles. A rotary mold carriage 17 directly supports the mold carriage and is rotated about said central column 16 by means of an electric motor (not shown) operating through a drive shaft 18, pinion 19, and a ring gear 20, the latter suitably fixed to the lower side of the mold carriage 17.

Each mold group 15 includes a blank or parison forming unit 21 and a finishing mold unit 22, the latter being arranged below the blank forming unit and mounted for up and down movement between blank transferring and article discharging positions. The blank forming unit 21 including a partible neck mold 23 and a partible body blank mold 24, is mounted for oscillation about a horizontal axis extending radially of the mold carriage 17 so that the molds may be placed in either of two positions, in one of which the charging opening of the body blank mold faces upwardly to receive a mold charge, while in the other, the body blank mold is open and a blank suspended from the neck mold in position to be enclosed in the finishing mold.

Figure 3:
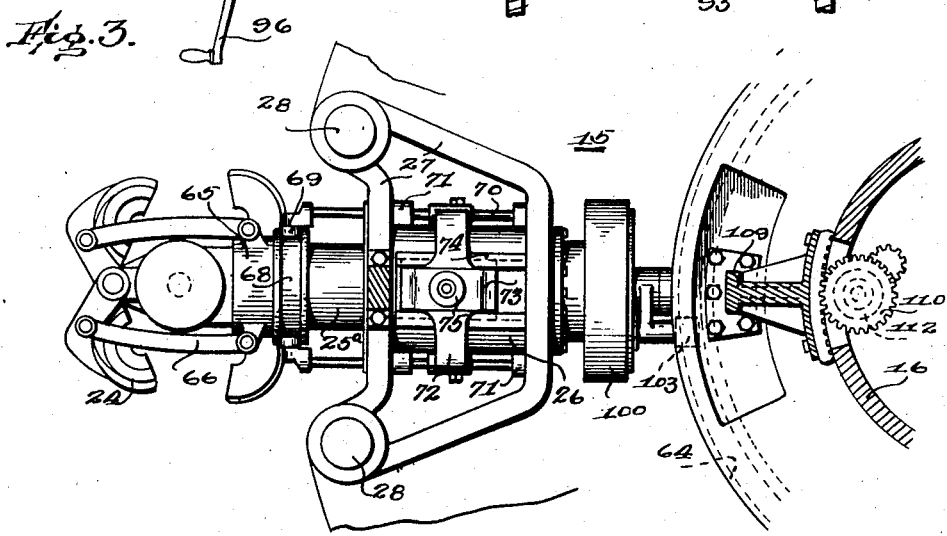
Fig. 3 is a sectional plan view taken substantially along the line III—III of Fig. 2.

Specifically each blank forming unit 21 includes a blank mold carrier 25 upon which the body blank and neck molds are pivotally supported. The carrier consists of a sleeve 25ª mounted for oscillation in a horizontal bearing 26, the axis of which extends radially of the mold carriage 17 This bearing 26 is carried by a frame 27 (Fig. 3) which is suitably mounted upon a pair of vertical posts 28 rising from the base portion of the mold carriage 17. The body blank and neck molds are pivoted to a hinge pin 29 at the outer end of the sleeve 25ª (Figs. 1 and 4), said hinge pin extending at right angles to the axis of the sleeve 25ª at the extreme outer end of the latter. A plunger 30 is arranged for movement into and out of the neck mold 23. The construction involved consists of a plunger holder 31 carried by the piston 32 of an air motor 33 at the outer end of the sleeve 25ª inwardly from said hinge pin 29. A coil spring 34 encircles the plunger holder 31 between the piston 32 and one end of the motor 33, serving to yieldingly hold the plunger in its retracted position.

Projection of the plunger at regular time intervals is obtained by applying air under pressure to the side of the piston opposite the coil spring 34. For this purpose an air conduit 35 is formed in the sleeve 25ª and constantly communicates with an annular channel 36 in the bearing 26. An air supply pipe 37 (Figs. 1, 4, and 15) is connected to the channel 36 and a valve 38, the latter supported on the mold carriage and connected to a supply pipe 39 leading to a chamber 40 which in turn communicates at all times with a source of supply of air pressure (not shown) by way of a pipe 41. The valve 38 includes a rock arm 42 which is operated periodically by means of a cam 43. Opening of the valve 38 admits air under pressure to the lower end of the motor 33 resulting in projection of the plunger into the neck mold. Shutting off flow of air to the motor permits the coil spring 34 to expand and thereby retract said plunger so that air under pressure may be introduced into the neck mold to enlarge the initial blow opening 44 which in the first instance was created by said plunger. A conduit 45 provided in the sleeve 25ª opens at one end in a chamber 46 (Fig. 4) and at its other end into an annular internal channel 47 in the bearing 26. This channel communicates through a pipe 48 with a valve 49 which in turn is connected to the air pressure supply pipe 39. A rock arm 50 associated with the valve 49 is operated at regular time intervals by a stationary cam 51.

Enlargement of the initial blow opening 44 is preceded by a blow down or glass compacting operation whereby the density of the glass in the neck end of the blank is materially increased in order to minimize the defects in the neck and shoulder structure. Enlargement of the blow opening 44 in the blank and closing of the charging opening of the body blank mold 24 prior to introduction of air through the neck mold may be obtained by a mechanism including a combined baffle plate and blow head 52 (Fig. 4) which is carried by a rock arm 53. This blow head is connected to the rock arm by means of a hollow stem 54 slidingly extending into a chamber 55 and having a radial port 56 which at times establishes communication between the interior of the hollow stem 54 and said chamber 55, and at other times, is positioned without said chamber so that said communication is shut off. The blow head has a plurality of outlet ports 57 through which air under pressure flows from the hollow stem to the interior of the body blank mold. A coil spring 54ª encircling the stem 54, normally holds it in such position that the port 56 is out of communication with the interior of said chamber 55. The chamber 55 is connected by a pipe 58 (Fig. 1) to the valve 38 which regulates the supply of air under pressure to the plunger motor 33.

Movement of the blow head 52 between its operative and inoperative positions is obtained by a stationary cam 59 (Figs. 1 and 11) operating through an arm 60, slide 61, and link 62, to swing the rock arm 53 about the hinge pin 63. During the time that the blow head is out of contact with the mold, the spring 54ª holds the stem in its outermost position and insures against flow of air through the ports 56 and 57. At the same time, because the valve 38 is open to permit application of air to the plunger motor 33, pressure is also built up in the pipe 58 and chamber 55 at the outer end of the rock arm 53. Thus, while the plunger is still projected into the neck mold the blow head 52 may be brought into engagement with the other end of the body blank mold 24 and air under pressure automatically applied to the glass through the charging opening of said mold. In this manner compacting of the glass in the neck end of the mold is accomplished prior to retraction of the plunger and enlargement of the initial blow opening 44.

Figure 5:
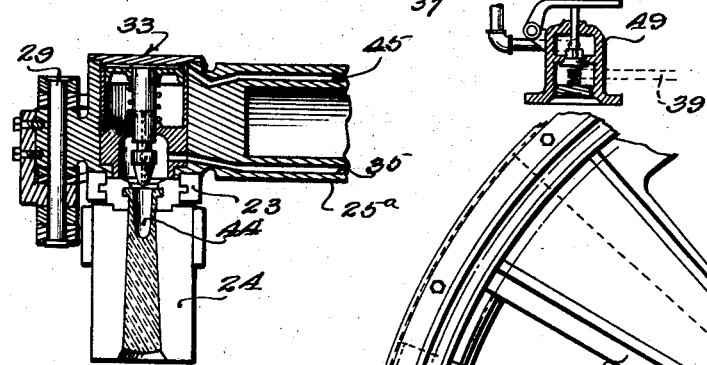
Fig. 5 is a fragmentary sectional view showing the blank mold inverted and the body blank mold still closed about the blank.
Figure 6:
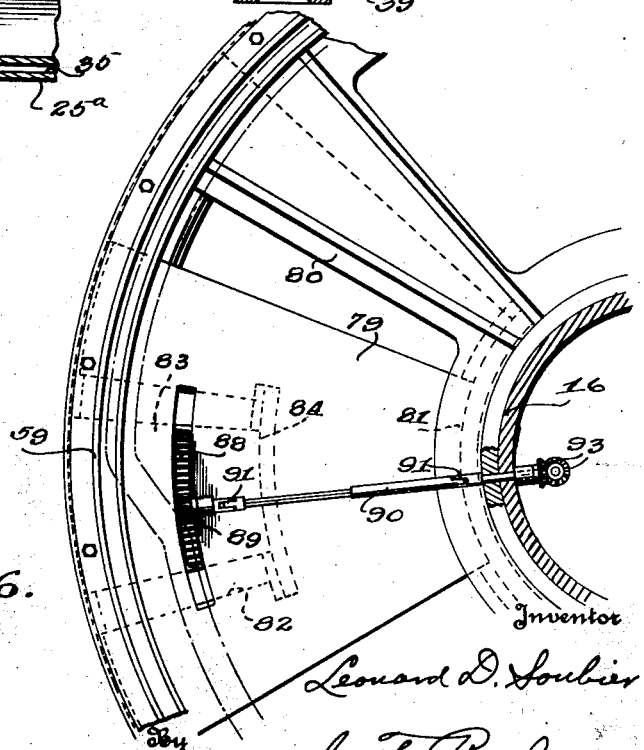
Fig. 6 is a detail plan view illustrating the means for adjusting the blank mold opening cam.

The body blank and neck molds which are mounted upon the vertical hinge pin 29 are adapted to be opened after they have assumed a pendent position such as shown in Figs. 2 and 5. First the body blank mold 24 is opened and later, as a result of a further opening movement on the part of the body blank mold, the neck mold is opened to permit transfer of the blank to the finishing mold unit 22. The connection between the body blank and neck molds whereby the neck mold is opened due to opening movement of the body blank mold, is of well known conventional form. The mechanism for opening these molds is operated by a stationary cam 64 (Figs. 1 and 7) and consists of a collar 65 slidingly mounted upon the sleeve 25ª and connected through links 66 to the blank mold sections. A pair of annular radial flanges 67 at one end of the collar 65 provide a continuous channel 68 to receive rollers 69. These rollers are mounted at the forward end of a pair of push rods 70 which are slidingly supported in bearings 71, the latter being integrally formed with the frame 27 supporting the mold carrier bearing 26. A yoke 72 straddles the bearing 26 and is connected at its end to the push rods 70 and at its center to a slide 73 mounted for reciprocation in a slideway 74. This slideway is formed in the upper side of the bearing 26 and extends lengthwise thereof. A cam roll 75 on the slide 73 runs in the blank mold cam 64.

The blank mold cam 64 (Figs. 2, 7, and 11) is continuous and includes an adjustable angular section 76 which opens the body blank mold 24 and a fixed angular section 77 adapted to impart an additional opening movement to the body blank mold and thereby open the neck mold 23. Both molds are thereafter closed preparatory to beginning another cycle of operations by means of the section 78. Provision is made whereby the position of the mold opening section 76 may be changed to thereby advance or retard the point of opening of the body blank mold 24. The construction whereby such adjustment may be obtained includes a carrier section 79 (Fig. 7) slidingly supported upon the spider 80 and held in radially spaced arcuate slideways 81 for circumferential movement between points A and B. This section is formed with an arcuate opening 82 in which the angular cam section 76 is mounted for adjustment about the axis of the central column 16. This angular cam 76 is carried by a slide 83 which has its inner and outer margins slidingly held in slideways 84. The end portions 85 of the angular cam 76 match up with and are slidable relative to the cam walls 87 on the carrier section 79. On the upper side of the slide 83 carrying said angular cam section 76, there is arranged an arcuate rack bar 88 constituting part of the mechanism for adjusting the cam section 76. A pinion 89 (Figs. 2 and 7) which is carried at the outer end of a telescopic shaft 90 runs in mesh with said rack bar. This shaft which includes universal joints 91, is journaled in bearings 92 and at its inner end has connection through bevel gears 93 with a vertical shaft 94. The lower end of the vertical shaft is connected by gears to a radially extending adjusting shaft 95 having a hand crank 96 at its outer end. By rotating the hand crank 96 and shaft 95 together with the other shafts and gears, the operative position of the angular cam section 76 may be advanced or retarded as operating conditions require.

Inversion and reinversion of the blank mold unit 21 for the purposes brought out heretofore, may be obtained by mechanism embodying the following construction. At the inner end of the sleeve 25ª (Figs. 1, 2, and 4) there is a stub shaft 97 which carries an external ring gear 98 or pinion. An internal ring gear 99 (Fig. 4) encircles said external ring gear in spaced relation thereto and is attached to the inner face of a drum 100 which is suitably fixed to the inner end of the bearing 26. A pinion 101 (Figs. 1 and 2) is arranged within said internal ring gear 99 and meshes with both the external and internal ring gears. Circumferential movement of the pinion rotates the external ring gear causing rotary movement of the blank forming unit about the axis of the sleeve 25ª so that the blank mold is alternately inverted and reinverted. Oscillation of the pinion 101 is obtained by mechanism including a rocker arm 102 pivoted for swinging movement about the axis of the shaft 97 (Fig. 4) said rocker arm carrying the pinion 101 and a cam roll 103. This cam roll 103 runs in a continuous cam 104 fixed to a spider 105 on the central column 16. In order that the point at which the blank forming unit is inverted may be adjusted to advance or retard inversion of the mold with respect to the body blank mold opening and other operations, an angular cam section 106 (Figs. 11 and 12) is adjustably mounted upon the spider 105. The construction includes a slide 107 and extensions 86 which slidingly fit into the adjacent ends of the mold inverting cam 104.

Adjustment of the angular cam section 106 is obtained by means including a rack bar 108 (Fig. 2) fixed to the inner margin of a connector 109 and a pinion 110 which runs in mesh with said rack bar. The pinion is carried by an adjusting shaft 111 to the lower end of which is fixed a pinion 112 adapted to be rotated manually by any suitable means (not shown). This shaft 111 is journaled in bearings 113 within the central column 16. It will be noted that because of the connector 109 (Fig. 2), adjustment of the mold inverting cam correspondingly adjusts the body blank mold inverting cam. However, the mold opening cam may be adjusted independently of the other cams. The advantages of this feature will be pointed out presently.

After the blanks or parisons have been completely formed they are transferred to the finishing mold unit 22 for final shaping. Each finishing mold unit 22 includes a partible finishing mold 114 mounted upon a finishing mold carrier 115 which is pivoted to the mold carriage for vertical swinging movement whereby the mold is alternately placed in blank transferring and article discharging positions. A serpentine track 116 (Fig. 1) supports the finishing mold units and assists in determining the successive positions of the finishing molds 114. Opening and closing of the molds is obtained by a stationary cam 117 operating through a slide 118 and suitable links 119, the latter connected to the holders 120 in the usual or any preferred manner.

Figure 1:
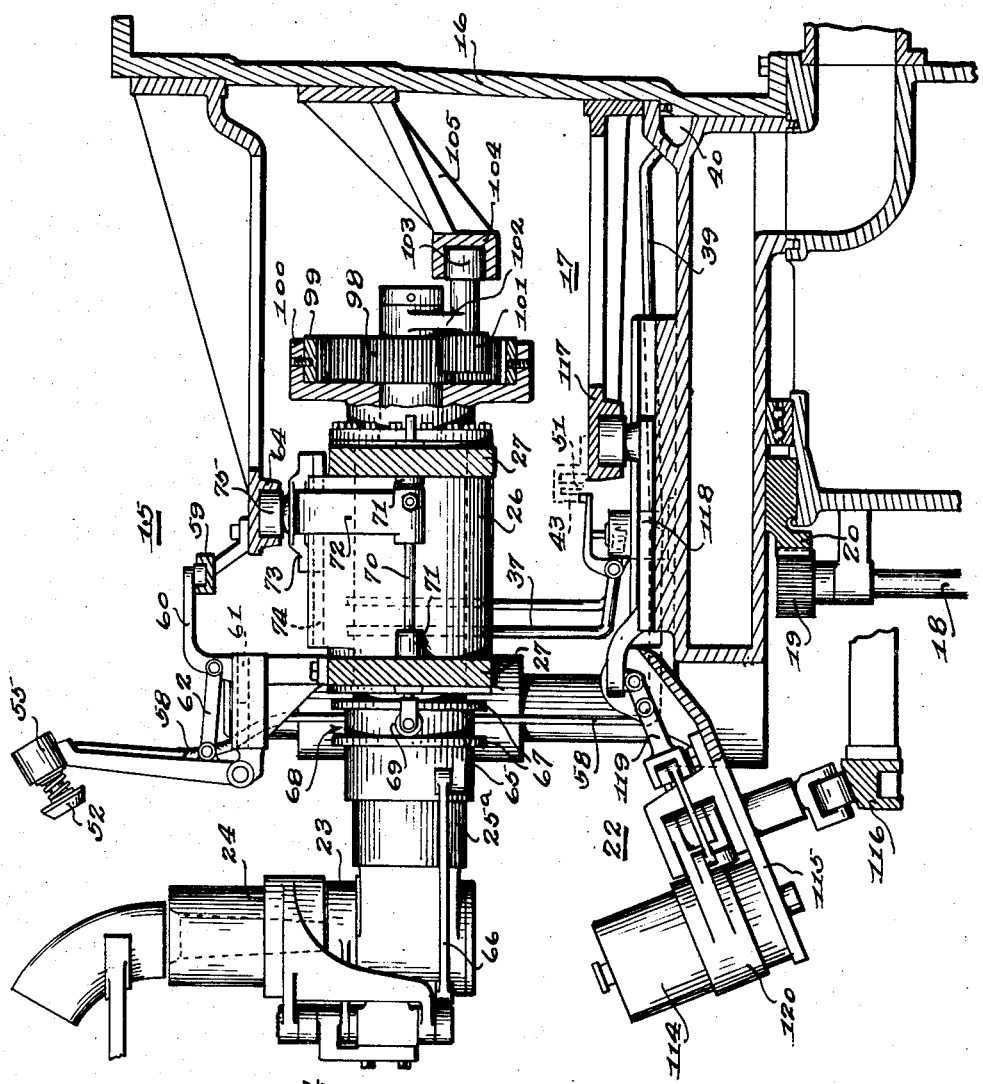
Fig. 1 is a side elevational view with parts in section showing one mold group constructed in accordance with the present invention and occupying the mold charging position.
Figure 4:
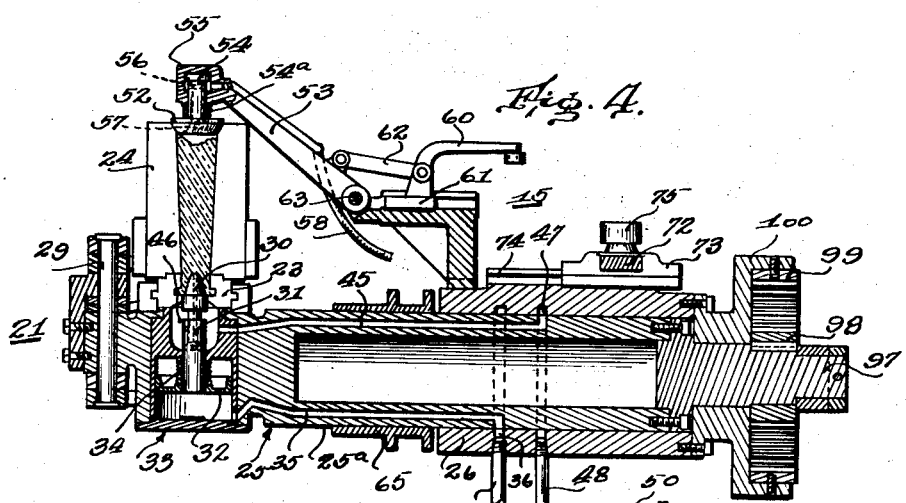
Fig. 4 is a fragmentary detail sectional view of the blank forming unit showing the blow down or blank compacting operation.

In reviewing the operation of the machine it will be assumed that the various parts are relatively positioned as shown in Fig. 1 wherein a mold charge of glass (not shown) is about to enter the combined body blank and neck molds which together constitute the blank or parison mold. At the time the mold charge is delivered to the blank mold the plunger is positioned within the neck mold as shown in Fig. 4 so that proper form will be given the neck end of the blank and an initial blow opening 44 formed. Air under pressure in the lower end of the motor 33 holds the plunger in this position. After the mold group has moved away from the charging position and while the plunger is firmly held in the neck mold, the combined blow head and baffle plate 52 is moved into position to close the charging end of the body blank mold 24. As has been brought out heretofore, opening of the valve 38 results in flow of air under pressure to the motor 33 and through the pipe 58 and chamber 55 up to the stem 54 which carries said combined blow head and baffle plate. Relative movement between the chamber 55 and the stem 54 carried by said combined blow head and baffle plate opens the port 56 and establishes communication between the chamber 55 and ports 57 so that a compacting blow of air under pressure is applied to the upper end of the blank. Thus the density of the glass is increased with the result that better distribution of glass in the finished article is obtained than where the compacting blow is not employed. The valve 38 will now be closed with the result that the plunger is withdrawn to the position shown in Fig. 5. At the same time the combined blow head and baffle plate will be returned to the position shown in Fig. 1. By means of the inverting mechanism, the blank forming unit is inverted to the position shown in Figs. 2 and 5 preparatory to effecting transfer of a blank to the finishing mold. When the blank mold has assumed the position shown in Fig. 5 and a predetermined extent of surface chilling of the glass obtained by contact with the mold, the body blank mold 24 will be opened as brought out heretofore, leaving the bare blank suspended from the neck mold 23. Immediately the finishing mold unit 22 will be raised and the mold 114 closed about the blank. This finishing mold 114 then cooperates with the neck mold 23 in holding the blank while air under pressure is introduced into the initial blow opening 44 for the purpose of expanding the blank to the shape of and into intimate contact with the walls of the finishing mold cavity. This final blow or expansion is obtained by a second opening of the valve 38.

When it is necessary to make a change in the machine so that it may be used in the production of another size of glassware the molds, plungers, and certain accessories, must be replaced. Certain changes in the cams will also be necessary and among these, in all probability, a forward or backward adjustment of the blank mold inverting and opening cams. If both the mold inverting and opening operations are to be advanced or retarded corresponding degrees, then adjustment of the angular cam section 106 which controls inversion of the molds will correspondingly change the position of the body blank mold opening cam. This is due to the rigid connection between the carrier section 79 and the angular cam section 106 (Fig. 2). If necessary, the body blank mold opening cam 76 may be adjusted to advance or retard the mold opening operation with respect to the inverting operation. Through the provision of means whereby these operations may be effected independently of each other as well as together, it is evident that the machine is well adapted for the production of a wide range of size of glassware, providing ideal operating conditions for the production of any of a wide range of sizes and/or shapes.

Modifications may be resorted to within the spirit and scope of the appended claims.

What I claim is:

1. A glassware forming machine comprising an annular series of mold groups rotatable about a vertical axis, means for continuously rotating the mold groups, each group including a mold carrier mounted for oscillation about a horizontal axis extending radially of the machine, a partible blank mold at the outer end of the carrier, cam controlled gear mechanism at the inner end of the carrier for alternately inverting and reinverting said blank mold, a finishing mold arranged beneath the blank mold, means operating at regular time intervals for raising the finishing mold to a blank transfer position and transferring a blank to said mold, said cam controlled gear mechanism including a stationary ring gear, a gear mounted on the mold carrier and arranged within said ring gear coaxially therewith, a pinion providing driving connection between said gears, and cam operated means for moving said pinion in a circular path between said gears to thereby oscillate the mold carrier at regular time intervals.

2. A glassware forming machine comprising a vertical stationary column, a mold carriage rotatably mounted thereon, an annular series of mold groups on said carriage, means for rotating the carriage to thereby bring the molds in succession to a series of operating positions including charge gathering, blank mold inverting, and opening positions, each mold group including an invertible partible blank mold, a finishing mold, a blank mold carrier mounted for oscillation about a horizontal axis extending radially of the mold carriage, cam controlled mechanism for opening and closing the blank mold, an adjustable stationary cam for operating said mechanism, cam controlled mechanism for inverting and reinverting the blank mold, an adjustable stationary cam for actuating said inverting mechanism, means for adjusting the mold opening cam about the axis of said vertical column, and separate means for adjusting the mold inverting cam and simultaneously therewith the mold opening cam about the axis of said vertical column, said adjusting means operable without interrupting normal travel of the molds.

3. In a glassware forming machine, an annular series of blank mold units rotatable about a vertical axis, means for continuously rotating said units to bring them in succession to mold charging and blank transfer positions, each blank mold unit including a carrier mounted for oscillatory movement about a horizontal radial axis, cooperating partible body blank and neck molds at the outer end of the carrier, means for alternately opening and closing the blank and neck molds, mold inverting mechanism including an external ring gear at the inner end of the mold carrier, a stationary internal ring gear encircling the external ring gear and disposed coaxially therewith, a pinion disposed between and providing driving connection between said ring gears, means for moving said pinion about the common axis of said ring gears to thereby impart rotary movement to the external ring gear whereby the mold carrier will be alternately inverted and reinverted, and finishing molds to which blanks are transferred from the blank mold units for final expansion.

4. In a glassware forming machine, an annular series of blank mold units rotatable about a vertical axis, means for continuously rotating said units to bring them in succession to mold charging and blank transfer positions, each mold unit including a carrier mounted for oscillatory movement about a horizontal radial axis, cooperating partible body blank and neck molds at the outer end of the carrier, means for alternately opening and closing the body blank and neck molds, mold inverting mechanism including an external ring gear at the inner end of the mold carrier, a stationary internal ring gear encircling the external ring gear and disposed coaxially therewith, a pinion disposed within the internal ring gear and providing driving connection between said ring gears, means for moving said pinion about the common axis of said ring gears to thereby impart rotary movement to the external ring gear whereby the mold carrier will be alternately inverted and reinverted, a rocker arm carrying said pinion, a stationary cam adapted to rock said arm at regular time intervals, means for adjusting the cam about the vertical axis of rotation of the mold units without interrupting normal travel of the units, and finishing molds to which blanks are transferred for final expansion.

5. In a glassware forming machine, an annular series of blank mold units rotatable about a vertical axis, means for continuously rotating said units to bring them in succession to mold charging and blank transfer positions, each mold unit including a carrier mounted for oscillatory movement about a horizontal radial axis, cooperating partible body blank and neck molds at the outer end of the carrier, means for alternately opening and closing the blank and neck molds, mold inverting mechanism including an external ring gear at the inner end of the mold carrier, a stationary internal ring gear encircling the external ring gear and disposed coaxially therewith, a pinion disposed within the internal ring gear and providing driving connection between said ring gears, means for moving the said pinion about the common axis of said ring gears to thereby impart rotary movement to the external ring gear whereby the mold carrier will be alternately inverted and reinverted, a rocker arm carrying said pinion, a stationary cam adapted to rock said arm at regular time intervals, means for adjusting the cam about the vertical axis of rotation of the mold units without interrupting normal travel of the units, means providing connection between said cam and the mold opening means whereby the mold opening and inverting operations may be simultaneously advanced or retarded corresponding degrees, and finishing molds to which blanks are transferred for final expansion.

6. In a glassware forming machine, an annular series of blank mold units rotatable about a vertical axis, means for continuously rotating said units to bring them in succession to mold charging and blank transfer positions, each mold unit including a carrier mounted for oscillatory movement about a horizontal radial axis, cooperating partible body blank and neck molds at the outer end of the carrier, means for alternately opening and closing the blank and neck molds, mold inverting mechanism including an external ring gear at the inner end of the mold carrier, a stationary internal ring gear encircling the external ring gear and disposed coaxially therewith, a pinion disposed within the internal ring gear and providing driving connection between said ring gears, means for moving said pinion about the common axis of said ring gears to thereby impart rotary movement to the external ring gear whereby the mold carrier will be alternately inverted and reinverted, a rocker arm carrying said pinion, a stationary cam adapted to rock said arm at regular time intervals, means for adjusting the cam about the vertical axis of rotation of the mold units without interrupting normal travel of said units, means providing connection between said cam and the mold opening means whereby the mold opening and inverting operations may be simultaneously advanced or retarded corresponding degrees, said blank mold opening means including a stationary cam and means for adjusting it independently of the mold inverting cam, and finishing molds to which blanks are transferred for final expansion.

7. In a glassware forming machine, a stationary central column, a mold carriage mounted for rotation about said column, means for continuously rotating said carriage, blank mold groups on the carriage, each group including a horizontal radial bearing rigidly fixed to the carriage, a blank mold carrier journaled in the bearing and extending beyond the inner and outer ends thereof, partible cooperating body blank and neck molds mounted on the outer end of the carrier, an external ring gear mounted at the inner end of the carrier, an internal ring gear fixed to the inner end of the bearing and encircling said external ring gear, a pinion meshing with both ring gears, means for oscillating the pinion to thereby impart oscillatory movement to the mold carrier, means for opening and closing the molds in timed relation to oscillation of the carrier, and finishing molds to which blanks ar transferred for final expansion.

8. In a glassware forming machine, a stationary central column, a mold carriage mounted for rotation about said column, means for continuously rotating said carriage, blank mold groups on the carriage, each group including a horizontal radial bearing rigidly fixed to the carriage, a blank mold carrier journaled in the bearing and extending beyond the inner and outer ends thereof, partible cooperating body blank and neck molds mounted on the outer end of the carrier, an external ring gear mounted at the inner end of the carrier, an internal ring gear fixed to the inner end of the bearing and encircling said external ring gear, a pinion meshing with both ring gears means for oscillating the pinions to thereby impart oscillatory movement to the mold carrier, means for opening and closing the molds in timed relation to oscillation of the carrier, a rocker arm carrying said pinion, a cam adapted to rock said arm at regular time intervals to thereby oscillate the pinion whereby the mold carrier is alternately inverted and reinverted, means for adjusting the cam about the central column while the mold carriage is in motion, means for alternately opening and closing the molds, and finishing molds in which blanks are finally expanded.

9. A glassware forming machine comprising a vertical stationary column, a mold carriage rotatably mounted thereon, an annular series of mold groups on said carriage, means for rotating the carriage to thereby bring the mold groups in succession to charge gathering, blank mold inverting, and mold opening positions, each mold group including an invertible partible blank mold, a finishing mold, a blank mold carrier mounted for oscillation about a horizontal axis extending radially of the mold carriage, cam controlled mechanism for opening and closing the blank mold, an adjustable stationary cam for operating said mechanism, cam controlled mechanism for inverting and reinverting the blank mold, a circumferentially adjustable cam for actuating said inverting mechanism, means whereby adjustment of the latter cam correspondingly changes the position of the cam controlling the mold opening and closing mechanism, means for changing the operating position of the mold opening and closing cam relative to the cam for inverting and reinverting the mold, and means whereby all of said cam adjustments may be effected without interrupting normal travel of the molds.

LEONARD D. SOUBIER.